United States Patent [19]

Tanizawa et al.

[11] Patent Number: 5,329,449
[45] Date of Patent: Jul. 12, 1994

[54] VEHICLE CONTROL SYSTEM FOR MULTI-BRANCHING TRACK

[75] Inventors: Hideichi Tanizawa, Moriguchi; Yoshitaka Watanabe, Takarazuka, both of Japan

[73] Assignee: Daifuku Co., Ltd., Osaka, Japan

[21] Appl. No.: 144,999

[22] Filed: Oct. 29, 1993

Related U.S. Application Data

[63] Continuation of Ser. No. 736,086, Jul. 26, 1991, abandoned.

[30] Foreign Application Priority Data

| Aug. 23, 1990 | [JP] | Japan | 2-223546 |
| Sep. 4, 1990 | [JP] | Japan | 2-234966 |
| Sep. 13, 1990 | [JP] | Japan | 2-245163 |
| Nov. 1, 1990 | [JP] | Japan | 2-296221 |

[51] Int. Cl.⁵ ............ B60T 7/16; G06F 7/70; G06G 7/78
[52] U.S. Cl. ............ 364/424.02; 364/443; 364/436; 180/169; 180/168
[58] Field of Search ............ 180/168, 169; 364/443

[56] References Cited

U.S. PATENT DOCUMENTS

| 3,636,883 | 1/1972 | Wesener | 104/50 |
| 3,722,426 | 3/1973 | Beer | 104/88 |
| 3,768,586 | 10/1973 | Thompson et al. | 180/98 |
| 3,780,666 | 12/1973 | Perrott | 104/88 |
| 4,023,753 | 5/1977 | Dobler | 246/5 |
| 4,148,260 | 4/1979 | Minovitch | 104/138 |
| 4,168,760 | 9/1979 | Paul, Jr. et al. | 180/168 |
| 4,554,498 | 11/1985 | Fujiwara et al. | 318/640 |
| 4,630,216 | 12/1986 | Tyler et al. | 364/468 |
| 4,736,812 | 4/1988 | Livneh | 180/168 |
| 4,743,078 | 5/1988 | Dahnert et al. | 312/201 |
| 4,791,570 | 12/1988 | Sherman et al. | 364/436 |
| 4,866,617 | 9/1989 | Matsuda et al. | 364/424.02 |
| 4,902,948 | 2/1990 | Sherman et al. | 318/580 |
| 5,094,173 | 3/1992 | Tada et al. | 104/282 |
| 5,126,941 | 6/1992 | Gurmu et al. | 364/424.02 |

FOREIGN PATENT DOCUMENTS

| 0261081 | 3/1988 | European Pat. Off. |
| 0320683 | 6/1989 | European Pat. Off. |
| 3715025 | 11/1987 | Fed. Rep. of Germany |
| 2592499 | 7/1987 | France |

*Primary Examiner*—Thomas G. Black
*Assistant Examiner*—Jacques H. Louis-Jacques
*Attorney, Agent, or Firm*—Webb Ziesenheim Bruening Logsdon Orkin & Hanson

[57] ABSTRACT

A vehicle control system for a multi-branching track has a main travelling track for guiding a vehicle, a storage unit disposed before a branch point and storing data for selectively guiding the vehicle to one of a plurality of branch tracks, and a data-reading unit mounted on the vehicle and for reading the data stored at the storage unit. The storage unit stores data of branching directions of the branch tracks and further data of addresses of stations included in the respective branch tracks, with the data and further data being correlated with each other.

17 Claims, 9 Drawing Sheets

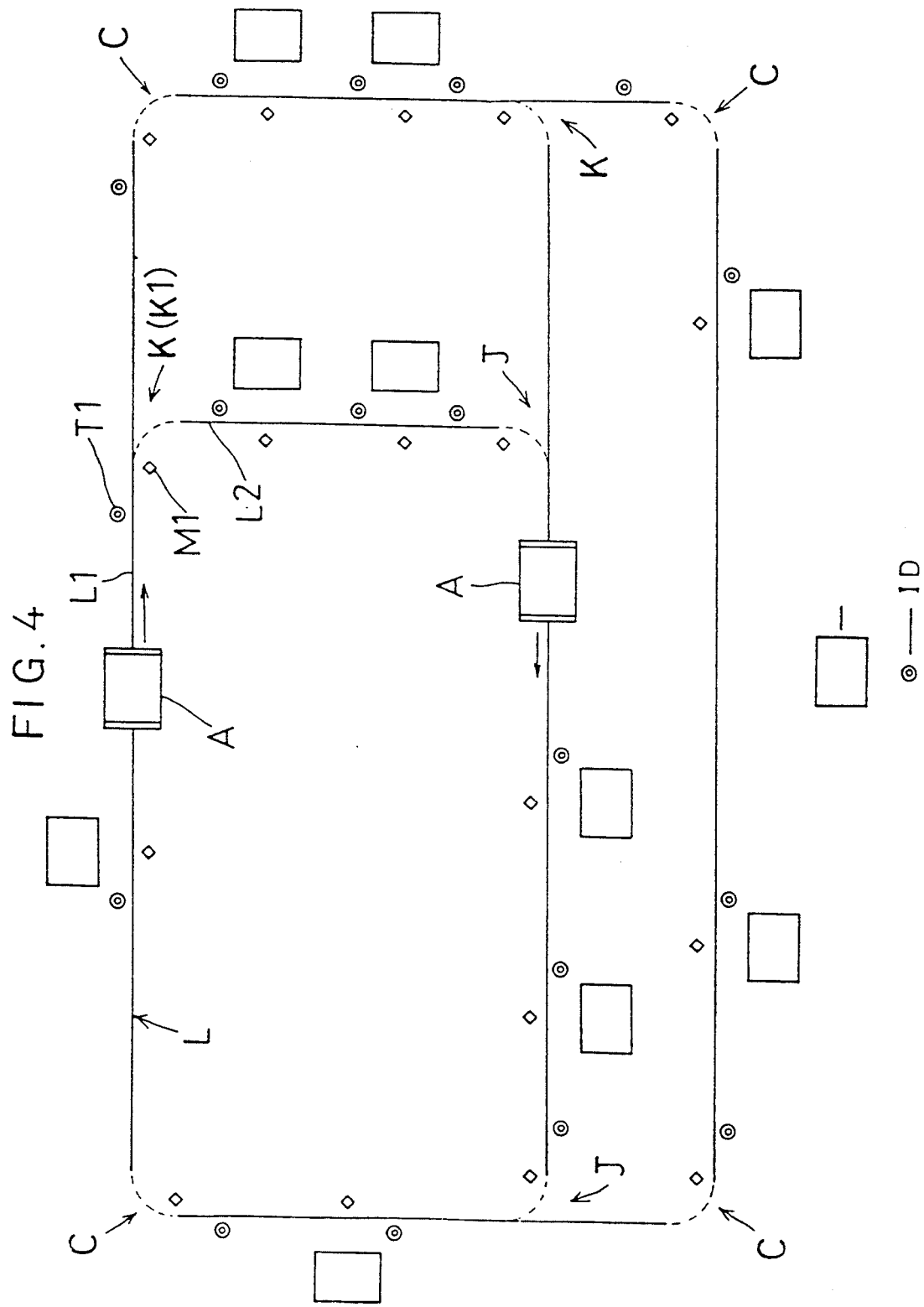

VEHICLE CONTROL SYSTEM FOR MULTI-BRANCHING TRACK

This is a continuation of copending application(s) Ser. No. 07/736,086 filed on Jul. 26, 1991 and now abandoned.

BACKGROUND OF THE INVENTION

1 Field of the Invention

The present invention relates to a vehicle control system for a multi-branching track, and more particularly to a system of the above-noted type including a storage means storing data for selectively guiding a vehicle to one of a plurality of branch tracks, the storage means being disposed before a branch point of a vehicle travelling track and read means mounted on the vehicle for reading the data stored at the storage means.

2 Description of the Related Art

A conventional vehicle control system of the above-described type is disclosed in e.g. the Japanese laid-open patent gazette No. 63-124113. This convention will be briefly described next.

In this system, a storage means (commonly referred to as an ID card or ID tag) having a writable memory and a wireless communication means is provided at a position before a branching point where a single branch track branches from a main track. The storage means stores data of an address of a station included in the branch track.

On the other hand, a vehicle includes a wireless communication means for communication with the storage means and through this means the vehicle reads the data stored at the storage means when the vehicle reaches the location before the branching point. Upon detection of presence of address data of a target station, the vehicle is guided to the branch track. With detection of absence of the data, on the other hand, the vehicle keeps travelling on the main travelling track without switching over to the branch track.

This conventional system has the advantage of flexiblity to cope with a change in the layout of the stations only through re-writing of the data stored at the storage means.

However, the conventional system is usable only for selective vehicle guidance between the main travelling track and one branch track. Furthermore, for simplicity of the system, the data stored at the storage means comprises only the address data of the station positioned within the branch track. Accordingly, the selective vehicle guidance of the system is effected only between the main track and the branch track depending on the presence or absence of the address data.

As a result, the conventional system is not usable for selectively guiding the vehicle among more than three tracks, e.g. one main track and right and left branch tracks.

The present invention attends to this inconvenience of the convention and its primary object is to provide an improved vehicle control system for a multi-branching track which system is usable for selective vehicle guidance among more than three tracks through communication with a storage means positioned before a branching point and storing data relating to the itinerary of the vehicle.

SUMMARY OF THE INVENTION

For accomplishing the above-noted object, a vehicle control system for a multi-branching track relating to the present invention, comprises:
- a main travelling track for guiding a vehicle;
- a storage means disposed before a branch point and storing data for selectively guiding the vehicle to one of a plurality of branch tracks; and
- a read means mounted on the vehicle and for reading the data stored at the storage means;
  wherein said storage means store data of branching directions of the branch tracks and further data of addresses of stations included in the respective branch tracks, said data and further data being correlated with each other.

Functions and effects of the above-described features of the invention will be described next.

When the vehicle reaches a predetermined location before a branch point, the vehicle reads the data stored at the storage means disposed at this predetermined location. Since these data include both the data concerning the address data of the station predetermined with respect to each branch track in correlation with the further data concerning the branching direction of the branch tracks, the vehicle identifies address data matching a target station preliminarily designated for the vehicle. Then, the system effects a steering control of the vehicle based on the branching direction data corresponding to the address data. The vehicle repeatedly executes the above steps until reaching the target station.

As a result, the present invention has achieved the intended primary object of providing an improved vehicle control system for a multi-branching track which system is usable for selective vehicle guidance among more than three tracks through communication with a storage means positioned before a branching point and storing data relating to the itinerary of the vehicle.

Preferrably, the storage means stores the address data concerning the station located at the branch track after a converging point of the plurality of branch tracks, in association with branching direction data of a branch track having a shortest distance to the target station. This additional feature has the following advantages.

That is on some occasions a plurality of tracks are available for the vehicle to reach the target station; that is the target station is located within a track after the branching tracks merge with each other. Then, since the storage means stores the address data of the target station in association with branching direction data of a branch track having a shortest distance to the target station, the travelling vehicle is steered at each branch point to take the shortest route to reach the target station. Thus, the invention's system with this additional feature can guide the vehicle to the target station through the shortest route.

Further and other objects, features and effects of the invention will become more apparent from the following more detailed description of the embodiments of the invention with reference to the accompanying drawings.

BRIEF DESCRIPTION OF THE DRAWINGS

Accompanying drawings illustrate preferred embodiments of a vehicle control system for a multi-branching track relating to the invention; in which, FIG. 4 is a plane view showing an entire layout of a system according to a further embodiment of the invention.

DESCRIPTION OF THE PREFERRED EMBODIMENTS

Preferred embodiments of a vehicle control system for a multi-branching track relating to the present invention will now be described with reference to the accompanying drawings.

Figure 1:
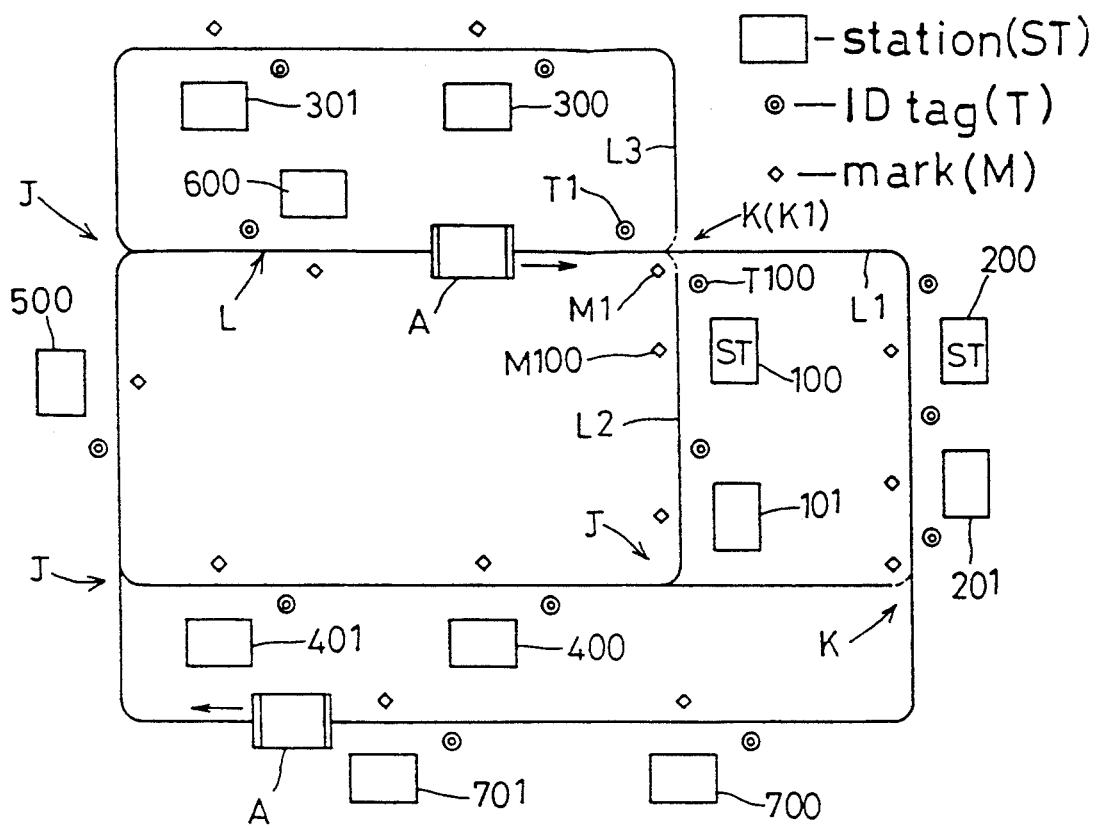
FIG. 1 is a plane view showing an entire layout of a system according to one preferred embodiment.

FIG. 1 shows an entire layout of a system according to the first embodiment. The system includes a main vehicle travelling track L for guiding travelling of a load-conveying vehicle A, the track L including a plurality of branch points K and merge points J. Further, a plurality of stations ST are disposed along the track L, where the vehicle A is stopped for conducting e.g. load mounting/dismounting operations. The entire system functions to effect load conveying operations through automatic vehicle runs between the stations.

Immediately before each branch point K, there is provided an ID tag T as a writable storage means for storing data relating to selective guidance of the vehicle A to one of a plurality of branch tracks branching from the branch point K. A further ID tag T is provided also at each station ST, and this tag T stores data for stopping the vehicle A at this station ST. In addition, at each branch point K and station ST, there is provided a mark M for helping the vehicle A to precisely detect where to start branching in its travel and where to stop.

Figure 2:
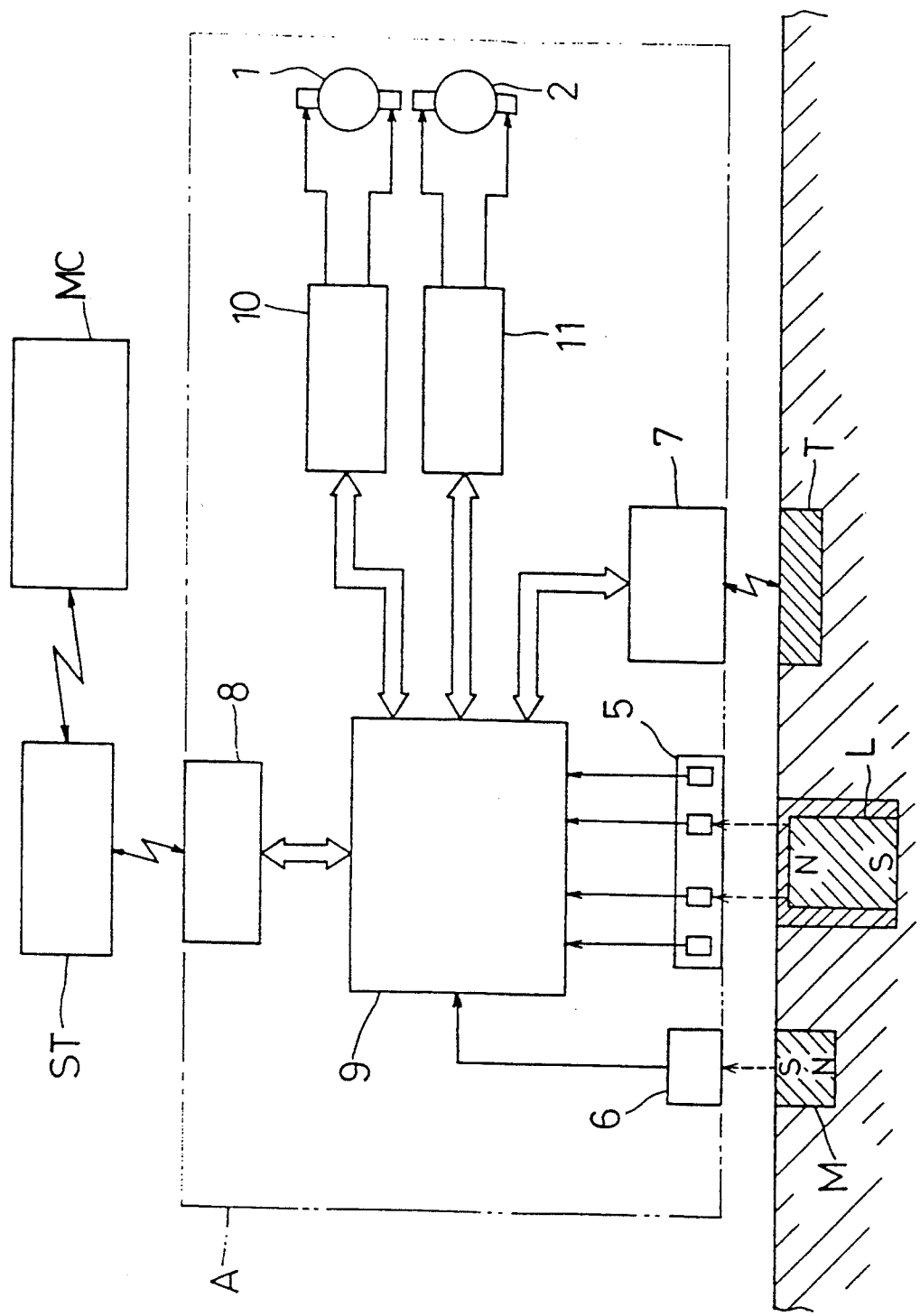
FIG. 2 is a block diagram illustrating signal communications executed between a vehicle and system peripherals.

As shown in FIG. 2, the main travelling track L is constructed as an embedded laid-out magnetic structure having a rectangular cross section, a front face of the magnetic structure having the N pole while a back face thereof having the S pole in this instant embodiment. Further, the entire surface of the magnetic structure is fixedly covered with epoxy resin material so as to assure uniformly smooth vehicle guiding face. The afore-mentioned mark M comprises a magnetic member having the S pole in its front face and the N pole in its back face. With this pole arrangement, the mark M is embedded along the track L.

Though not shown in the drawings, the ID tag T comprises a packaged unit integrally housing a writable semiconductor memory (RAM), a controller having a communication means for communications with peripherals and a battery. The communication means is constructed as an erasable bi-directional communication means operable by electromagnetic guidance. The communication means is capable of non-contact external data re-write and read operations and of storing the data by the power of the battery.

Figure 3:
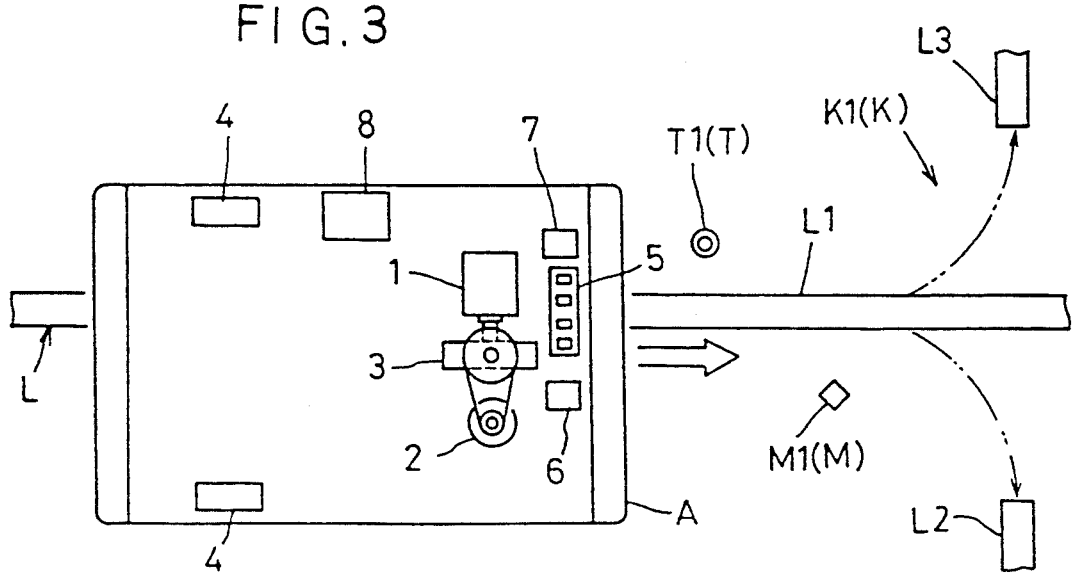
FIG. 3 is a schematic plane view showing a construction of the vehicle.

As shown in FIGS. 2 and 3, the vehicle A includes a motor 1 disposed at a forward position of the vehicle for driving it, a driving-steering wheel 3 to be driven for propelling by the motor 1 and also by a steering motor 2 for steering and a pair of right and left driven wheels 4 mounted at rear side positions of the vehicle A. Further, a magnetic sensor 5 is disposed forwardly of and steerable with the drive wheel S for detecting the track L and obtaining therefrom data for vehicle steering control. At a right front position of the vehicle body A, there is provided a mark sensor 8 for detecting the mark M. This mark sensor 8 too comprises a kind of magnetic sensor and detects the mark M when approaching it.

Furthermore, at a left front position of the vehicle body A, there is provided a tag reader 7 for reading the data stored at the ID tag T. This tag reader 7, when approaching the ID tag T, effects electromagnetic guidance communication with the tag T for reading the stored data from the tag T.

At a left central position of the vehicle body A, there is mounted a communication unit 8 including a light emitting element and a light receiving element. On the other hand, an associated communication unit having a light emitting element and a light receiving element is provided at a position of the station ST where the vehicle A is stopped at this station ST, so that communications are effected between the vehicle A and this station ST. Alternately, communications are effected via this station ST between the vehicle A and a central control unit MC for executing the entire system control. For example, when the vehicle A communicates to the station ST completion of operation at this station ST, address data of a next target station for a next job is given from the station ST to the vehicle A.

In addition to the above-described components, the vehicle A also mounts a control device 9 having a microcomputer for processing the data from the sensors 5, 6, the tag reader 7 and the communication unit 8 in order to control the run of the vehicle A, a drive unit 10 for the propelling motor 1, a further drive unit 11 for the steering motor Z, and so on.

As shown in FIGS. 2 and 3, the magnetic sensor 5 comprises a plurality of magnetism-sensing elements (four in number in this instant emobidiment) arranged transversely relative to the vehicle body and with a predetermined distance therebetween. So that, when the vehicle A is properly positioned widthwise relative to the travelling track L, that is, when the vehicle A is positioned at the center of the travelling track L, the inner two of the four sensing elements sense magnetism of the track L while the outer two elements do not sense the magnetism.

Accordingly, when the vehicle A deviates sidewise relative to the track L, either of the two outer elements comes to sense the magnetism of the track L, upon which detection the control device 9 executes a steering control operation for properly adjusting the position of the vehicle A relative to the track L.

Though not shown, the tag reader 7 includes a communication means for effecting electromagnetic guidance control with the ID tag T and its controllor, so that the tag reader 7 communicates the data obtained from the ID tag T to the control device 9. The vehicle A, when propelling, keeps transmitting at a predetermined cycle to the ID tag T a request signal for requesting the data stored at this tag T. On the other hand, the ID tag T is maintained ready for receiving the request signal from the tag reader 7. Therefore, when the moving vehicle A approaches the ID tag T closely enough to enable the ID tag 7 and the tag reader 7 to communicate with each other, the ID tag T receives the data request signal from the tag reader 7 and responds to this request. Although subsequent communication protocol will not be described here, with the above establishment of communication between the ID tag T and the tag reader 7, the stored data of the ID tag T is communicated to the tag reader 7. In this way, the vehicle A while running can automatically read the data stored at the respective ID tags T located at the predetermined positions.

Next, the data stored at the ID tag T will be particularly described.

First, the ID tag T positioned before the station ST, in particular, an ID tag T100 positioned before a station ST designated with an address 100 in FIG. 1 will be described. Incidentally, a mark M100 is a mark for detecting a stop position of the vehicle at this station 100.

This ID tag T100 is to store at least three kinds of data: data indicating the location being near the station ST, data indicating this station ST being designated with the address 100 and data representing a distance to the stop position detecting mark M100. Based on these data, the vehicle A first judges whether or not to stop at this station 100. If it is judged that the vehicle A is to stop at this station 100, then, the vehicle effects proper speed reduction based on the data concerning the distance to the stop position and will be stopped accurately at this stop position. More particularly, when the vehicle A left the previous station, the vehicle A was disignated with an address of the next target station and has stored this address data at its memory. Therefore, as the vehicle A approaches every station ST in the track L, the vehicle A compares the stored address data with an address data obtained from the ID tag disposed before the station. With matching of these data, the vehicle A stops at this station ST. Otherwise, the vehicle just passes it.

Next, the data stored at the ID tag T disposed before the branch point K will be particularly described. The ID tag T1 disposed before the branch point K positioned upwardly of the above-described station 100 shown in FIG. 1 will be taken as an example. Incidentally, a mark M1 is a mark for accurate detection of a start point of the curved branch track extending from this branch point K.

The first data stored at this ID tag T1 comprise data representing this branch point K, upon receipt of which data the vehicle A identifies this ID tag T1 as being a branch point ID tag, not other tags for e.g. the stations ST. The second data stored at the ID tag T1 comprise data concerning branching run. More particularly, in the case of this particular branch point K1, three tracks are extended therefrom; namely, the straight extending main travelling track L1, a right-turning branch track L2 and a left-turning branch track L3. Therefore, e.g. turn-angle data of 0, +90 and −90 are designated as the second data for the branch run. Where, the straight run is represented as the 0 degree data, the right turn run is represented as the '+' (plus) degree data and the left turn run is represented as the '−' (minus) degree data, respectively. Based on this branching run data and the detection data of the mark M1, the vehicle A makes a turn at the branch point K to a predetermined one of the three branch tracks L1, L2 and L3. For minimizing installment costs of the travelling track L, except for the main guide track L, there are provided no electromagnetic guidance lines at the curved passages in the branch guide tracks L2, L3. Therefore, when the vehicle A is switched to either the branch track L2 or the branch track L3, with respect to the detection point of the mark M1, the vehicle A effects a steering control based on the branching run direction (+90 or −90) to switch to the branch track L2 or L3. On the other hand, in the case of the main guide track L1, the vehicle just keeps propelling based on detection data of the magnetic sensor 5.

The third data stored at the ID tag T1 comprise addresses of all the stations ST accessible along each branch track. That is, as illustrated in Table 1 below, the ID tag T1 stores, as this third data, data concerning the addresses of all stations ST located beyond the branch point K1, with the address data being sorted in accordance with the branching data of the respective branch guide tracks L1, L2 and L3. Accordingly, based on this information, the vehicle A can determine the proper branch guide track. For instance, assuming that the control unit 9 now stores at its memory the address 100 as the target station address, this control unit 9 of the vehicle A scans the stored data at the ID tag T1 to look for an address matching this address 100. With detection of the matching address and its relating guide track, the vehicle A recognizes this guide track as being the one to take to reach the target station. Incidentally, although those stations with addresses: 400, 401, 500 and 600 located beyond a converging point J are accessible through either the main guide track L1 or the branch guide track L2, as may be apparent from Table 1, the ID tag T1 stores these addresses in correlation with only the main guide track L1 having the shortest extention.

TABLE 1

| branch tracks | L1 | L2 | L3 |
|---|---|---|---|
| branch data | 0 | +90 | −90 |
| accessible | 200 | 100 | 300 |
| stations | 201 | 101 | 301 |
| | 700 | 400 | |
| | 701 | 401 | |
| | | 500 | |
| | | 600 | |

Referring again to Table 1, the ordering of the addresses of the stations ST stored in accordance with the respective guide tracks L1, L2 and L3 can be at random. However, in case a greater number of stations ST exist, it is conceivable to serially number the addresses, so that the tag T1 stores only those having the smallest and the greatest numbers.

In the manner described above, the vehicle A judges the branching direction based on the data read from the ID tag T1 at each branch point K provided in the guide track L and can reach the target station through the shortest passage.

For writing the data to the ID tag T, though not shown, a transportable terminal device having an electromagnetic guidance communication unit like the tag reader 7 is used. Alternately, it is conceivable to effect the data writing operation by means of a further vehicle programmed to effect the data writing operation to the tag T while the vehicle running along the track L.

If the travelling passage of the vehicle A and the stations for the vehicle A to making stop are to change due to modification in the system layout, the changes can be coped with merely by re-writing, by the above-described means, the data stored at the IT tag T disposed at the branch point K.

Some other embodiments of the present invention will be described next.

In the system of the foregoing embodiment, the vehicle is switched over among three branch tracks in the directions of straight, 90-degree left and 90-degree right. However, as may have become apparent from the above-description, since the ID tag T1 of the invention is capable of storing any angle data as branching run data and the vehicle A can switch to any direction based on the corresponding angle data, it is possible for even greater number of branch tracks to extend from the branch point K.

Further, in case the vehicle A finds no address, in the data read from the ID tag T provided before the branch point K, which data corresponding to that of the target station, it will be advantageous for the entire system if the vehicle A communicates this absence of address to the central control unit MC from a nearest station ST to receive instruction from the control unit MC.

In a more complicated transport system having a greater number of stations ST, it is not convenient to cause the ID tag T disposed before the branch point K to store the addresses of all the stations ST accessible through the branch point K. In this case, therefore, it is conceivable to cause the tag T to store e.g. only the address of the main station representing each branch track with the vehicle A being instructed of not only the address of the target station but also of that of the main station representing the branch track to be taken.

Figure 5:
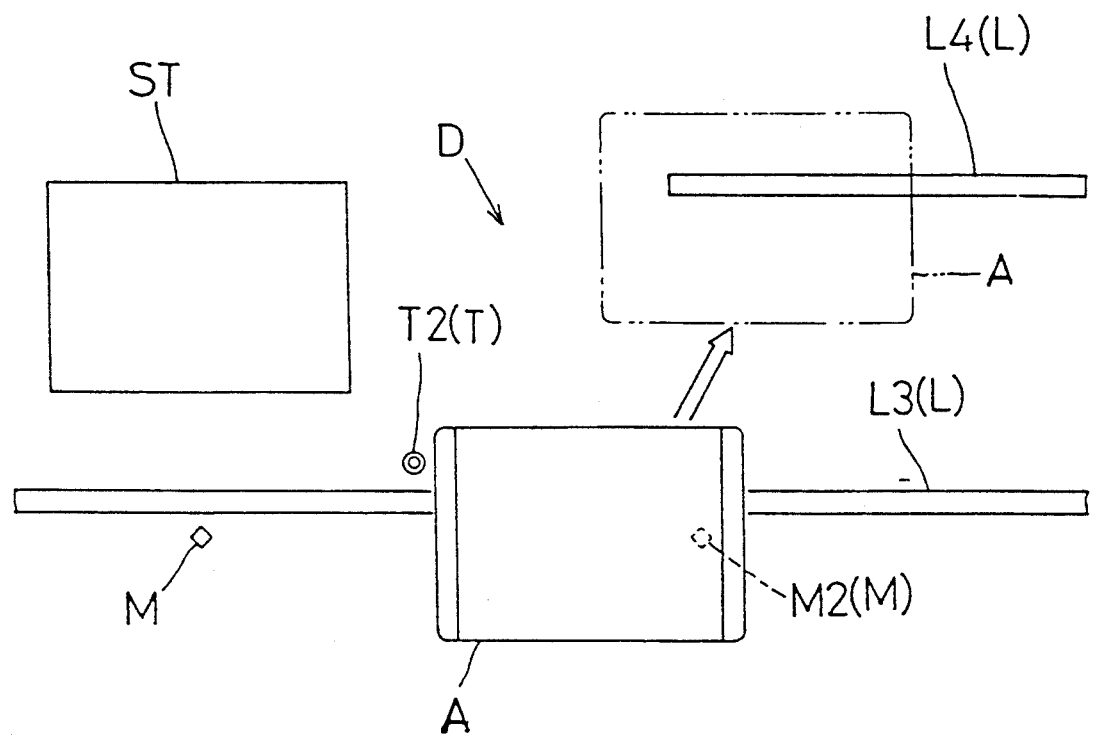
FIGS. 5 and 6 show a still further embodiment of the invention, with FIG. 5 being a system layout plane view, FIG. 6 being a vehicle construction view.

Further, in an alternate system construction shown in FIGS. 4 and 5, the main vehicle travelling track L consists of upstream lines L1, L3 and downstream lines L2, L4, with the former lines L1, L3 being discontinuously separate by predetermined distances from the latter lines L2, L4, such that the vehicle A effects a self-contained run through the predetermined distances to switch over to the downstream line L2 or L4.

This arrangement is advantageous for reducing installation costs of the track L and for minimizing soiling or damage of the track which tends to occur when the vehicle effects a curving travelling motion. The arrangement is advantageous also for making it possible to form a groove for an fire-preventive shutter at such position when and if this becomes necessary.

More particularly, referring again to FIGS. 4 and 5, the magnetic structure is not embedded at predetermined positions K, J and C. Accordingly, the vehicle A effects a self-contained run for the predetermined distances, as described hereinabove. The data necessary for this self-contained run are stored at the ID tags disposed before the predetermined positions K, J and C. The vehicle A reads the stored data as approaching the ID tag and effects the self-contained run based on this data. Immediately before the predetermined positions K, J and C, there is provided a mark M acting as a reference position beyond which the vehicle A is to effect the self-contained run.

The data to be stored at the ID tags T will be particularly described next. As described hereinbefore, the main vehicle travelling track L of this alternate construction has 'cutouts', i. e. discontinuities, at the predetermined positions, namely, the branch point K, the converging point J and the corner C. And, the ID tags T disposed before these positions store the data necessary for the vehicle A to effect the self-contained run for these cutout portions. The stored data are unique to each predetermined position. Specifically, taking the ID tag T1 before the branch point D1 for instance, this ID tag T1 stores the data specified below.

(1) data identifying the branch point and its address;

(2) data indicating that track L is branched beyond this point into the straight track L1 and the right branch track (3) data indicating the distance from the mark M1 to the branching start position (i.e. the start position of the self-contained run);

(4) data indicating a turning radius of the right turn;

(5) data indicating a running speed during the right turn;

(6) data indicating a running speed after the right turn (i.e. after switching over to the branch track L2); and (7) data indicating an address after the turn.

Accordingly, based on the above-specified data read from the ID tag T1 and also on the itinerary data pre-stored at the vehicle A, the vehicle A effects judgement whether to proceed straight or to make a right turn at the branch point D1.

In the case of the right turn, the vehicle runs for the distance dictated by the above data (3) and then steering control for a steering angle determined by the data (4) and effects the right turn at the turning speed determined by the data (5). Thereafter, as the magnetic sensor 5 detects the branch track L2, the vehicle A is switched over from the self-contained run back to the electromagnetically guided run and continues this run at the running speed determined by the above data (6).

The ID tags T disposed before the other predetermined positions too will store the vehicle control data including the turning radius and the travelling speed unique to each position. In this way, the system can achieve very fine and sophisticated vehicle travelling control operations.

Incidentally, as shown in FIG. 4, the ID tag T and the mark M are provided also before each station ST. This ID tag T stores data including the distance from the mark M to each station ST. The vehicle A reads this data and compares this with the address of the target station stored at the vehicle. Without mathching of these data, the vehicle just passes through this station. If these data match each other, with detection of the mark M, the vehicle A effects speed reduction based on the data indicating the distance from the mark M to the station ST and effects a stop control so as to accurately stop at the predetermined stop position.

As described above, with the combination of the electromagnetically guided run along the main travelling track L and the self-contained run at the predetermined positions; i.e. the branch point K, the converging point J and the corner C, the vehicle propells along the pre-designated itinerary to reach the target station ST.

The specific construction of the main travelling track is not limited by the present invention to that disclosed in the foregoing embodiment. For instance, the track L can comprise a magnetic tape means installed along the vehicle running face. Or, the track L can comprise a light-reflecting tape while the vehicle A mounts a light sensor means instead of the magnetic sensor.

In these alternate constructions, like the foregoing embodiment, it is conceivable to cut the magnetic or light-reflecting tape at not only the curved passage portions but also at some straight passage portions. For, such tape tends to be damaged or soiled by repeated passages thereacross of the vehicle, i.e. its wheels whereby errors may occur in the vehicle travelling control. Therefore, the cutouts will function to avoid such inconvenience.

As the control data for enabling the vehicle to effect a self-contained straight run during the cutout passage portions, the ID tag T stores data dictating locking of the steering vehicle wheel to the straight direction, instead of the data indicating the turning radius for making a turn.

Figure 6:
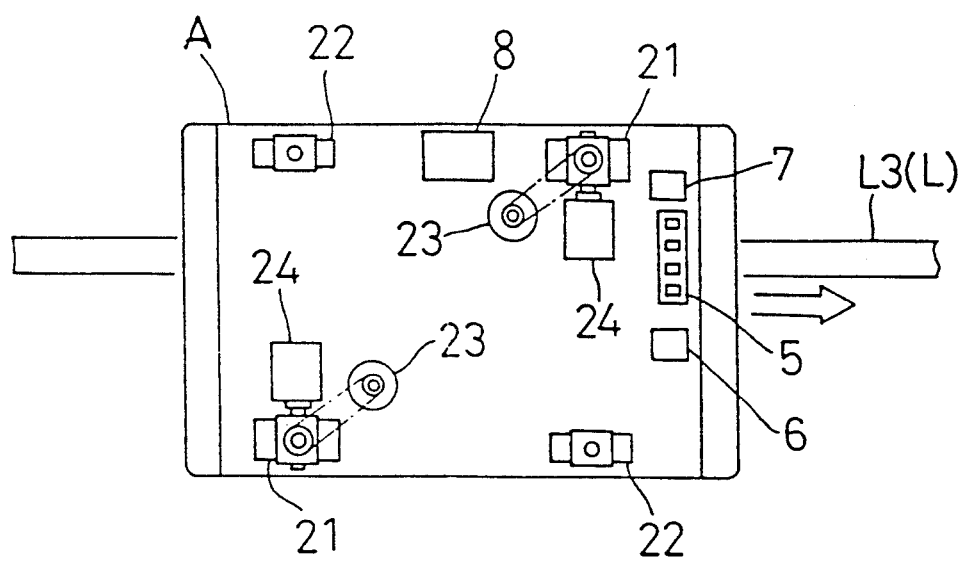

On the other hand, as shown in FIG. 5, when the vehicle A is to be switched over from the main track L3 to the branch track L4 installed with a small distance from and in parallel with the main track L3, it is convenient if this vehicle A makes an obliquely transverse movement without changing its running posture. In this case, the vehicle A per se must be so constructed as to be able to effect such movement, as e.g. shown in FIG. 6.

This vehicle A includes four wheels two 21 of which disposed diagonally to each other are steerable and driving wheels and the other two 22 of which are caster wheels comprising two driven wheels each capable of free rotation about a vertical axis as well as about a horizontal axis. A numeral 23 denotes a motor for steering the wheels 21 and a numeral 24 denotes a further motor for driving these wheels 21. Incidentally, the same components of this vehicle A as those of the foregoing vehicle shown in FIG. 3 are denoted with the same reference numerals. The transverse drive of this vehicle A is effected as a so-called parallel steering for steering the forward and rear steerable-driving wheels 21 in the same direction while maintaining these wheels 21 in parallel with each other.

In FIG. 5, the during the switching from the main travelling track L3 to the branch track L4 by the above-described transverse movement, the vehicle A effects a self-contained run. The control for this self-contained run can be effected in the same manner as described in connection with the right-turn control at the branch point K1 in the foregoing embodiment. That is, the vehicle A reads, by means of the tag reader 7, the running control data stored at the ID tag T2 disposed before the transverse branching point. And, based on the data, the vehicle effects the left transverse turn using the mark M2 as the reference point.

Therefore, the data stored at the ID tag T2 include the followings.

(1) data identifying the branch point and its address;

(2) data indicating whether to go straight or to switch over to the branch track L4 by making a lift transverse turn;

(3) data indicating the distance from the mark M2 to the transverse branching start position (i.e. the start position of the self-contained run);

(4) data indicating a turning radius of the left transverse turn;

(5) data indicating a running speed during the left transverse turn;

(6) data indicating a running speed after the left turn (i.e. after switching over to the branch track L4);

(7) data indicating the distance of the transverse movement; and (8) data indicating an address after the turn.

Accordingly, based on the above-specified data read from the ID tag T1 and also on the itinerary data prestored at the vehicle A, the vehicle A effects judgement whether to proceed straight or to make a left transverse turn at the branch point.

In the case of the left transverse turn, the vehicle runs for the distance dictated by the above data (3) from the point of detection of the mark M1 and then effects parallel steering control for a steering angle determined by the data (4) and effects the left transverse turn at the turning speed determined by the data (5) for the distance determined by the data (7). Thereafter, as the magnetic sensor 5 detects the branch track L4, the vehicle A is switched over from the self-contained run back to the electromagnetically guided run and continues this run at the running speed determined by the above data (6).

In this embodiment, the upstream track and the downstream track are predetermined in accordance with the order in their travelling direction of more than two vehicles simultaneously operating within the system. Therefore, in case more than two vehicles A are propelled in the reverse directions relative to the single track L, the storage means T will be provided on the both sides of the predetermined positions K, J and C.

A still further embodiment of the present invention will be described next.

It is conceivable for the system of the present invention to incorporate a vehicle stop control device for causing the vehicle A to stop at the predetermined stop position after causing the vehicle A to effect gradual speed reduction from a position with a predetermined distance before the stop position.

In this case, from the upstream side along the vehicle travelling direction before the predetermined stop position, the storage means capable of storing the vehicle control data and the mark indicating the reference position will be disposed with a predetermined distance therebetween, with the storage means storing at least this distance between the storage means and the mark. Whereas, the vehicle mounts the read means for reading the stored data from the storage means, a mark sensor for sensing the mark, a travelling distance measuring means, a speed-reduction device for enabling the vehicle to effect the predetermined gradual speed reduction and a control device for calculating a position for starting the speed reduction based on the travelling distance data, the distance from the mark and the speed-reduction data, so that the predetermined reduced speed is achieved immediately before the stop position and the speed-reduction device is operated at the speed-reduction starting position.

Figure 8:
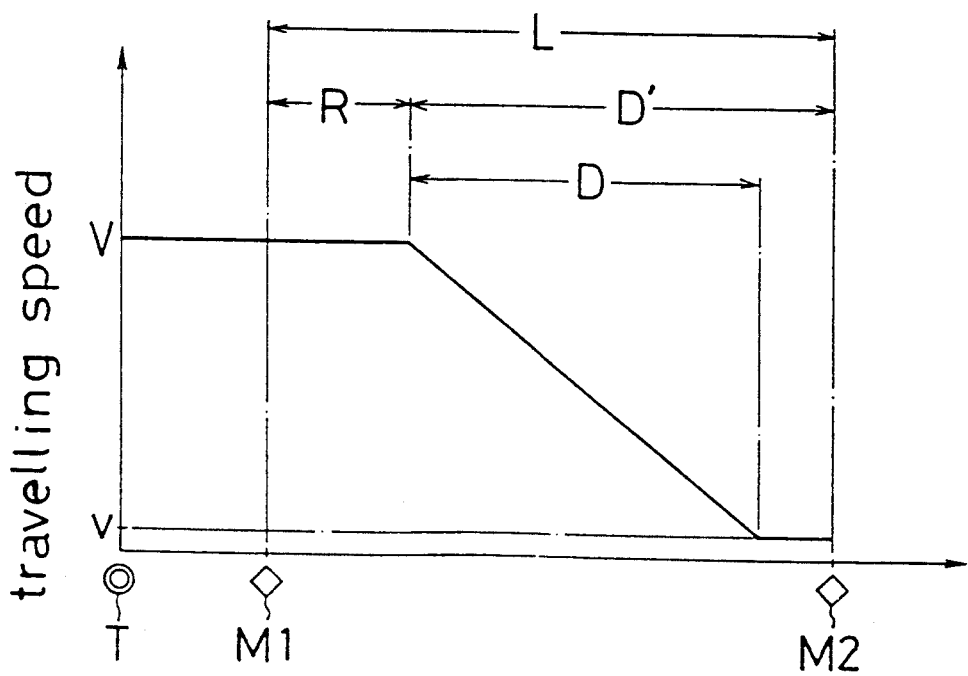
FIG. 8 is a descriptive view illustrating a vehicle stop control operation.

This vehicle stop control operation will be described mope particularly with reference to FIG. 8.

The vehicle travels along the main track L and reads, by means of its read means, the data stored at the storage means. Based on this data, the vehicle recognizes a distance L from the mark M1 to the predetermined stop position. Then, based on the speed reduction ratio of this particular speed-reduction device, the control device of this vehicle calculates a distance D measured from the point where the speed reduction is started to the further point where the predetermined reduced speed is reached. A distance obtained by adding an appropriate safety distance D' to this calculated distance D will comprise the distance from the speed-reduction starting position to the stop position.

As the vehicle A further travels, the mark sensor of the vehicle detects the mark M1. Then, a further travelling distance R is calculated by the travelling distance measuring means 14. The control device actuates the speed-reduction device when a difference between the distance L and the travelling distance R (L−R); that is, when the distance from the vehicle to the predetermined stop position becomes equal to the above distance D'. As a result, the vehicle achieves the predetermined reduced speed at the position immediately before the stop position, i.e. the position distant from the latter by the safety distance.

Incidentally, for causing the vehicle to stop at the predetermined stop position, this is possible by causing the vehicle A to determine based on the travelling distance R that the vehicle has reached the stop position. However, in general, as illustrated in FIG. 8, a further mark M2 will be provided at the stop position for the vehicle to detect this further mark M2.

The storage means employed by the system of the present invention is a writable storage means. Therefore, a slight change in the predetermined stop position due to e.g. change in the system layout may be coped with only by re-writing the data stored at the storage means, without having to change the storage means per se or the disposing positions of the marks.

Still more preferably, the moving vehicle mounts a speed detecting means 15 for detecting a running speed of the vehicle. Then, based on the speed data obtained by the speed detecting means 15, the control device will calculate the position where the speed reduction is to be initiated.

More particularly, since the speed detecting means 15 detects the running speed of the vehicle A, the stop control operation will be effected appropriately even when the running speed of the vehicle varies. That is, if the vehicle travels along the track at a predetermined constant speed, the speed-reduction starting point will be appropriately obtained without such speed detecting means if the vehicle pre-stores the predetermined constant speed. However, if the running speed of the vehicle varies at the various portions of the track, the vehicle stop control operation can be appropriately effected only with the running speed detection by the speed detecting means.

Accordingly, even when the distance between the predetermined stop position and the position of the mark disposed before the stop position is not constant, the vehicle can recognize the distance based on the data stored at the storage means disposed before the mark and can effect the gradual speed reduction to achieve the predetermined reduced speed immediately before the stop position. Therefore, the vehicle will be stopped smoothly and accurately at the predetermined stop position. Moreover, it becomes also possible to minimize the distance covered by the vehicle during the gradual speed reduction before complete stop. Consequently, with the above-described additional feature, the invention has achieved a further improvement in the system having significantly improved transport efficiency and greater flexibility to cope with e.g. layout changes.

Figure 7:
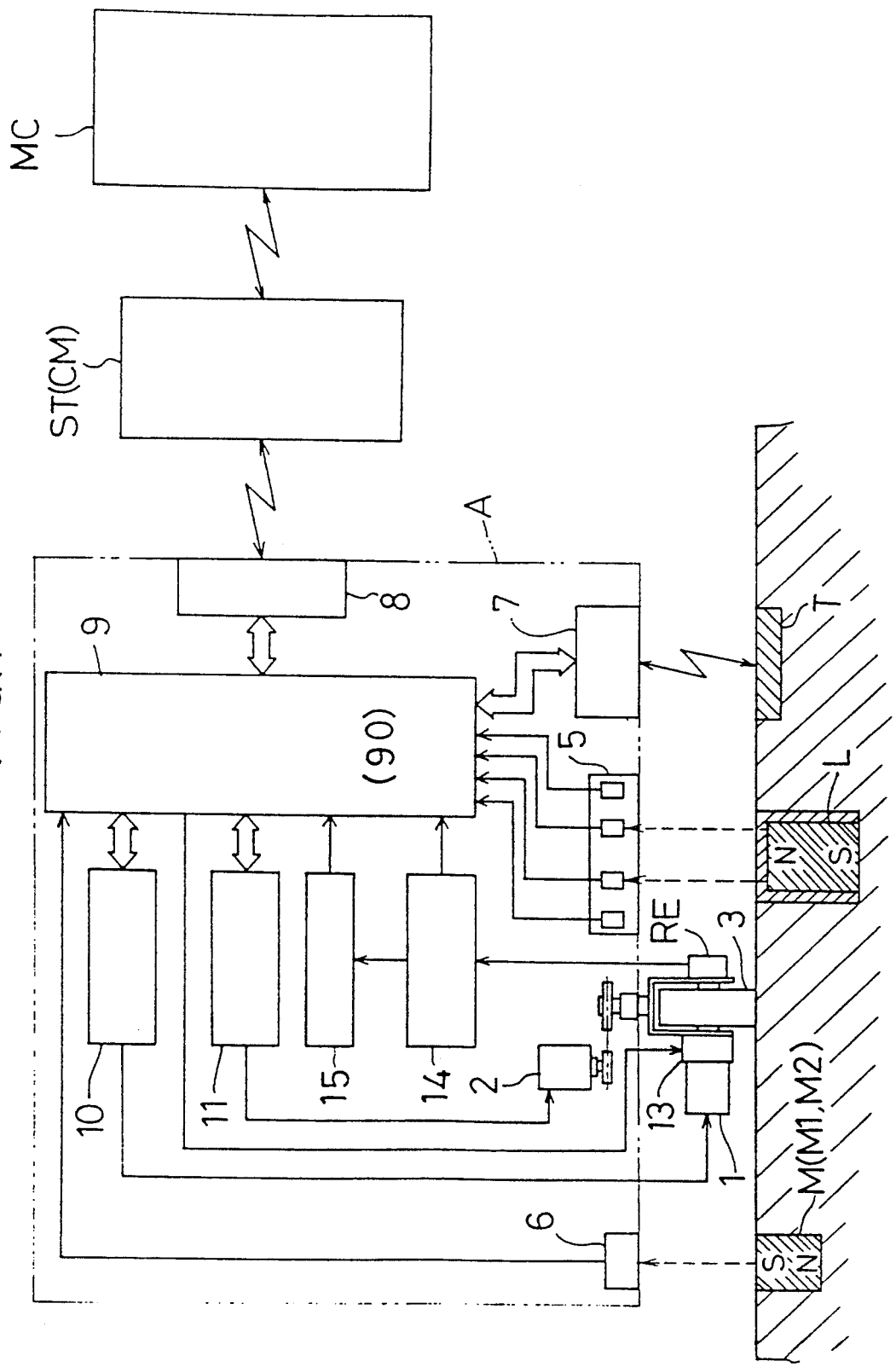
FIG. 7 is a block diagram illustrating signal communications executed between a vehicle and system peripherals employed in a system of a still further embodiment.
Figure 9:
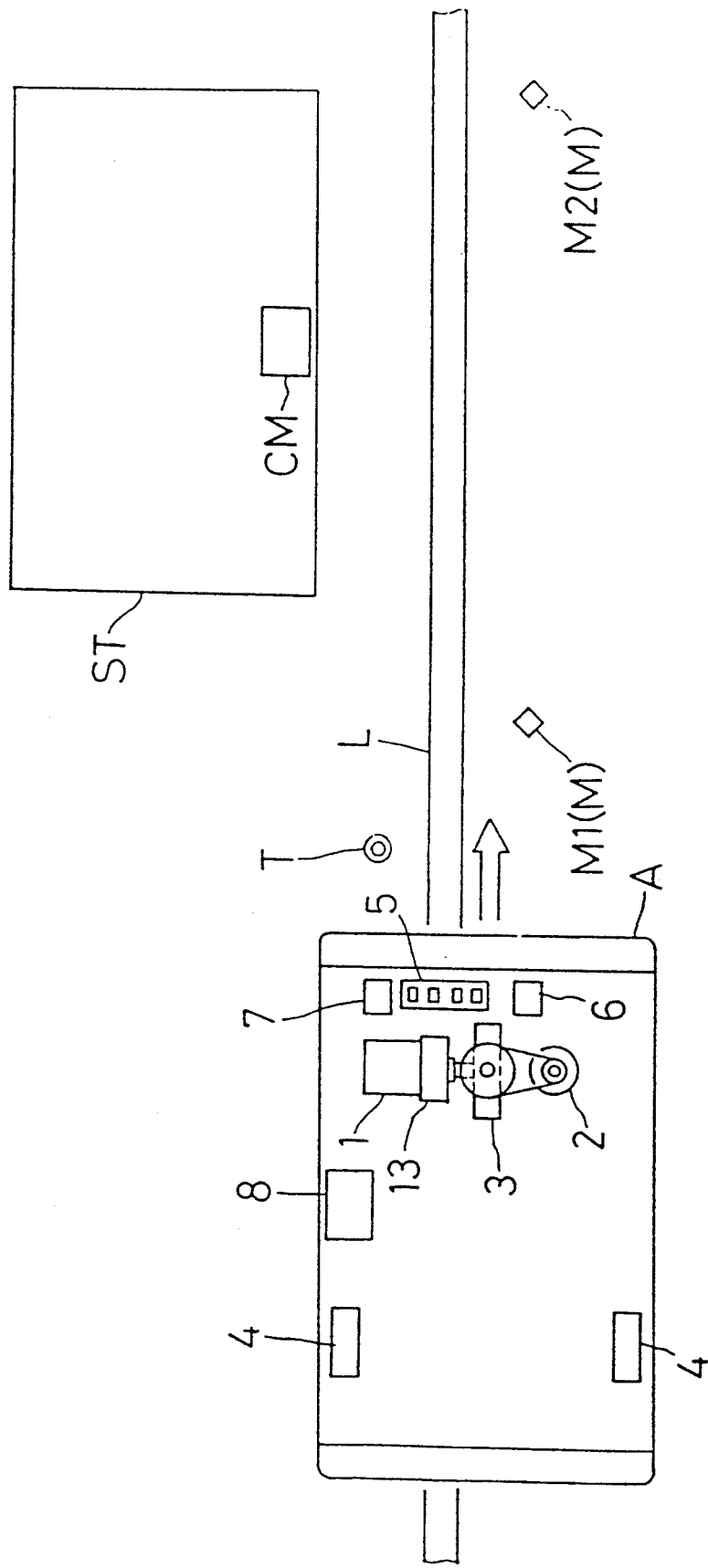
FIG. 9 is a plane view illustrating relationship between a schematic construction of a vehicle and its stop position.

The above alternate embodiment will be more particularly described next with reference to FIGS. 7 and 9.

The control device 9 mounted on the vehicle A can execute also the predetermined speed reduction control of the drive motor 1. That is, the speed reduction device 90 utilizes this control device 9.

The travelling distance of the vehicle A is measured by the travelling distance measuring means 14 based on outputs from a rotary encoder RE which generates pulses in association with rotation of the vehicle wheel 3. On the other hand, the travelling speed of the vehicle A is detected by the speed detecting means 15 having a time-measuring function and constructed to calculate the travelling speed of the vehicle based on a travelling distance per unit time period. These data concerning the travelling distance and the travelling speed are inputted to the control device 9, where the data are used for a vehicle-stop control operation to be described later.

This control device 9 actuates the speed reduction device 90 at a point obtained in a manner to be described later, based on the distance L from the mark M1 to be detected by the mark sensor 6 to the predetermined stop position, the travelling distance R measured from the mark M1 by the travelling distance measuring means 14, the travelling speed V detected by the speed detecting means 15, the predetermined reduced speed 'v' and on the speed reduction ratio 'a' of the speed reduction device 90. When the predetermined reduced speed 'v' is achieved and upon detection of the mark M2 by the mark sensor 6, the control device 9 immediately actuates a braking unit 13. The predetermined reduced speed 'v' is defined herein as the lowest speed controllable by the vehicle A and as such speed at which the vehicle can stop almost immediately with actuation of the braking unit 13.

The control device 9 obtains by calculation the point to initiate the speed reduction, for the purpose of minimizing the time period of the predetermined reduced speed 'v', i.e. for enabling the vehicle A to achieve the speed 'v' immediately before the stop position.

Where the speed reduction ratio 'a' is constant, the distance D covered by the vehicle A until achieving the reduced speed 'v' after the initiation of speed reduction is expressed as:

$$D=(V-v)^2/(2a)$$

Accordingly, the safety distance is added to this distance D to obtain the distance D'. Whereby, if the vehicle initiates speed reduction at the point distant by the distance D' from the predetermined stop position, the vehicle will achieve the reduced speed 'v' at the position immediately before the predetermined stop position, i.e. at the position distant by the safety distance from the stop position.

After the detection of the mark M1, the distance between the current position of the vehicle A to the stop position is obtained as the difference (L−R), i.e. the difference between the distance L from the mark M1 to the stop position and the travelling distance R from the mark M1. Therefore, the target position to initiate the speed reduction is obtained when the above difference value corresponds to the distance D' (see FIG. 8).

As described above, as the vehicle A travels along the track L and approaches the target station ST, the vehicle A initiates gradual speed reduction at the appropriate point obtained in accordance with the travelling speed based on e.g. the stop control data from the ID tag T and the mark detection data and the vehicle A effects accurate and smooth stop at the predetermined position.

In the foregoing embodiment, the control device 90 controls the rotation speed of the propelling motor 1.

Instead, the control device 90 can be so constructed as merely to stop the motor 1 thus applying a predetermined braking force to the vehicle wheels. In this case, however, the vehicle A effects the speed reduction at the rate determined by its inertial mass, rotational friction force and the braking force of the braking unit 13 and so on. Therefore, the actuation of the braking unit 13 must be effected with consideration to these factors. In other words, the predetermined reduced speed may not always be achieved, depending on possible variations in the above-listed conditions. Therefore, this construction is inferior to that of the previous embodiments in terms of operation reliability of the system.

A still further embodiment of the invention will be described next.

In this alternate embodiment, the control device of the vehicle further includes a control mechanism for preventing a subsequent vehicle A from entering a predetermined zone Z of the track if the foregoing vehicle A currently stays in this zone Z.

Further, at the starting end of this predetermined zone Z, there are provided a detecting means capable of detecting passage of a vehicle and storing the detection data without power supply, an electric-powered release means for releasing, with electric power supply, the stored data at the detecting means and a transmission coil for transmitting the stored data of the detecting means.

Further, at the terminal end of the predetermined zone Z, there is provided a power-receiving coil for receiving the electric power to be supplied to the releasing means.

On the other hand, the vehicle A includes a detected member to be detected by the above-described detecting means, an electromagnetic coupling type data transmission means for supplying the power through an electromagnetic coupling with the power-receiving coil and a travelling control means for controlling travelling of this vehicle.

Preferably, the travelling control means is so constructed as to stop the subsequent vehicle when the data transmission means detects the data indicating presence of the foregoing vehicle and to allow the subsequent vehicle to enter the zone Z when the data transmission means detects absence of the foregoing vehicle within the zone Z.

The functions and effects of the above-described construction will be described next.

An example case will be described where two vehicles are to pass the predetermined zone Z.

When the first vehicle passes the start end of the zone, the detecting means detects the detected member of this first vehicle and stores this vehicle-presence data.

With this condition, when the second vehicle reaches the start end of the zone, the data transmission means detects the stored condition of the detecting means, i.e. reads the vehicle-presence data through the transmission coil, whereby the second vehicle is stopped.

On the other hand, when the first vehicle passes the terminal end of the zone, the electric power is supplied from the data transmission means to the power-receiving coil, thus releasing the vehicle-presence data stored at the detecting means. As a result, the second vehicle is allowed to enter the zone Z.

Since the power for releasing the vehicle-presence data is supplied from the vehicle, the detecting means can be of the passive type, i.e. without any power source of its own. Further, the vehicle-presence data can be read through the data transmission coil provided at the start end of the zone, there is no necessity of providing special signal lines or additional data transmission means solely for this transmission of vehicle-presence data.

Consequently, the entire vehicle control system can be constructed simple.

This embodiment will be more particularly described with reference to the accompanying drawings.

Figure 12:
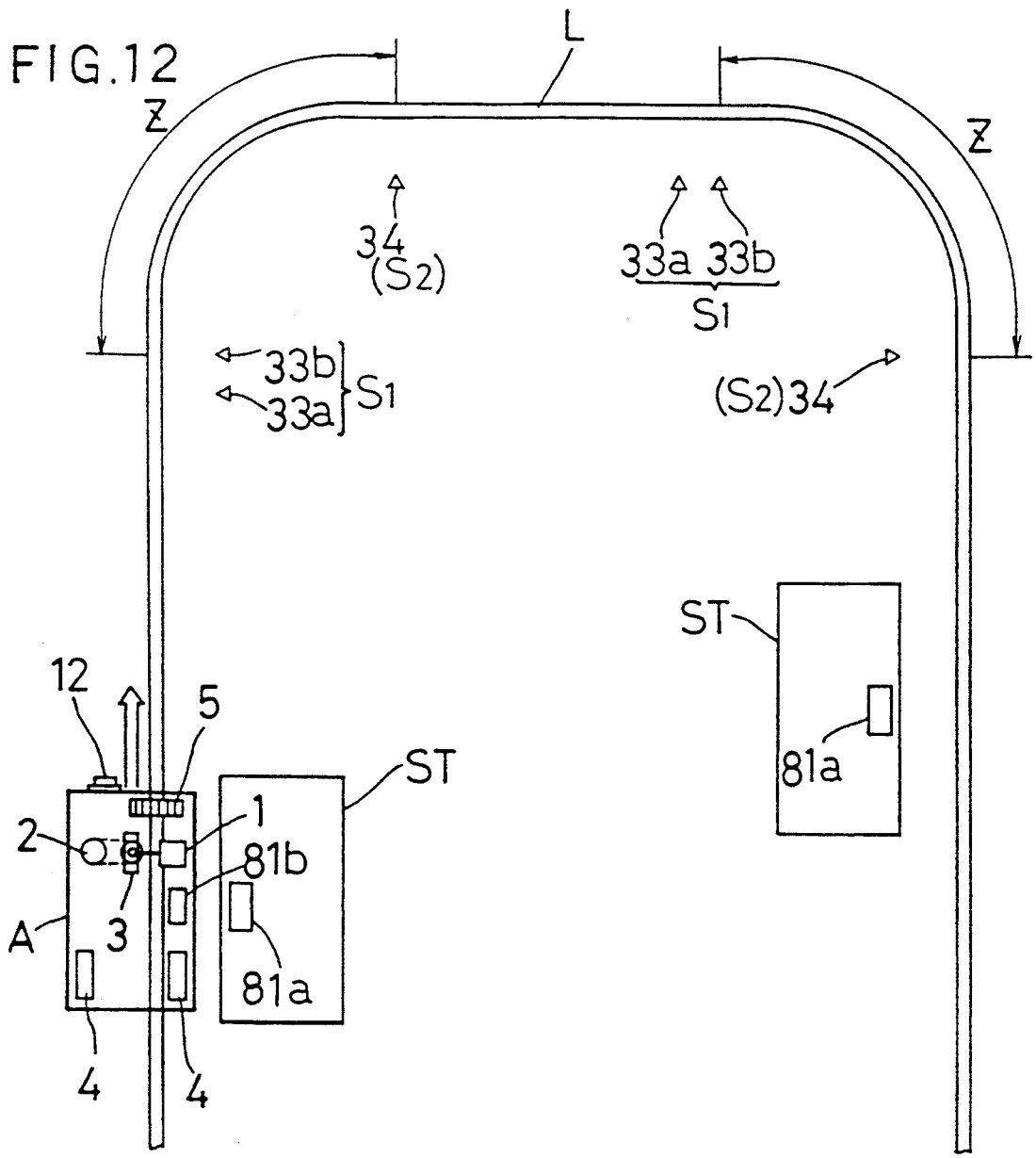
FIG. 12 is a schematic plane view of a vehicle travelling track.

As shown in FIG. 12, a magnetic tape L acting as the vehicle guide track is installed along the vehicle travelling passage and the stations ST are provided at appropriate locations along the lateral sides across the guide track.

At the predetermined zones e.g. curved track portions, for the purpose of preventing the second vehicle from entering each zone while the first vehicle remains in this zone, a first detecting portion S1 is provided at a starting end of the zone Z and a second detecting portion S2 is provided at a terminal end of the zone Z, respectively.

On the other hand, at each station ST, there is provided a stationary communication unit 81a for communicating from the contral control unit MC to the moving vehicles A various data indicating the station ST to make a next stop, the itinerary to the target station and so on.

Figure 11:
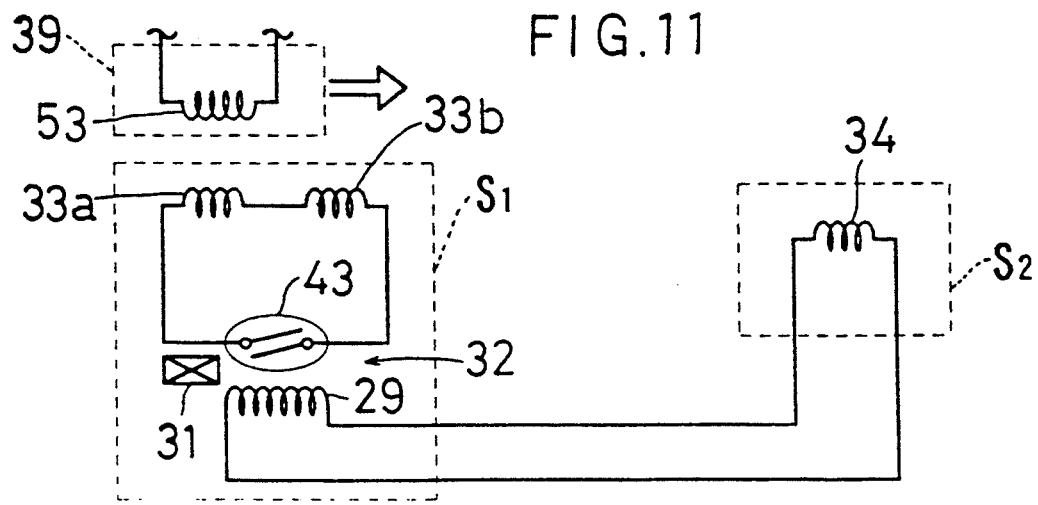
FIG. 11 is a circuit diagram of a detecting unit.

At the first detecting portion S1, there are provided a self-holding type reed switch acting as the detecting means capable of detecting passage of the vehicle A and storing this detection data without power supply and a pair of transmission coils 33a and 33b. The reed switch 32, as shown in FIG. 11, includes a contact-holding magnet 31 and a reset coil 29. That is, with the passage of the vehicle A trough the start end of the zone Z, a contact 43 is closed by the function of a magnet 30 to be described later. Then, the reset coil 29 is magnetized by a power-receiving coil 34 to be described later, whereby he contact 43 remains closed until being opened. That is, this reset coil 29 corresponds to the electric-powered releasing means.

The two transmission coils 33a, 33b are disposed with a predetermined distance therebetween so that the coils 33a, 33b are electromagnetically coupled with a coupling sensor 39 (to be described later) when the vehicle A passes the starting end of the zone. Further, the respective coils 33a, 33b are serially connected with the contact 43, thus forming a closed loop when the contact 43 is closed and forming an opened loop when the contact 43 is open.

At the second detecting portion S2, there is provided the power-receiving coil 34 which becomes electromagnetically coupled with the coupling sensor 39 when the vehicle A passes the terminal end of the zone.

Figure 10:
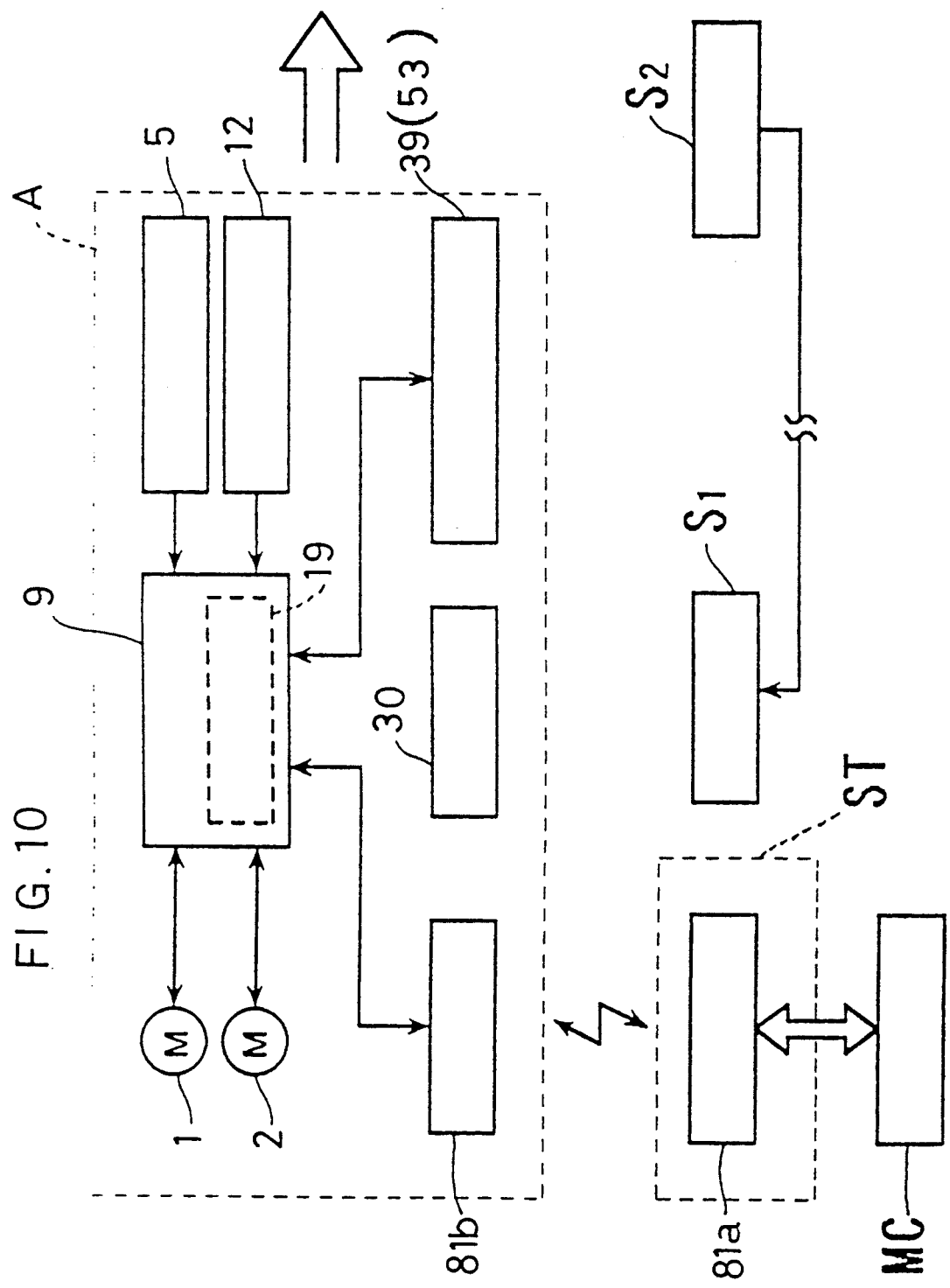
FIG. 10 is a block diagram of a control system according to a still further embodiment.

The construction of the vehicle A will be particularly described next with reference to FIGS. 10 and 12. The vehicle A includes a pair of right and left drive wheels 4 diposed side by side at rear positions of the vehicle body and a steering-driving wheel 3 steerable by a steering motor 2 and disposed at a front position of the vehicle body.

Further, the vehicle A mounts the coupling sensor 39, the magnet 30 acting as the detected member to be detected by the reed switch 32, the steering control sensor 5 fop detecting transverse displacement of the vehicle body relative to the magnetic tape L and the optical sensor 12 lot detection of approaching of this vehicle relative to the foregoing vehicle.

The coupling sensor 39 will be described more particularly. This coupling sensor 39 includes a coupling coil 53 to be electromagnetically coupled with the transmission coils 33a, 33b and with the power-receiving coil 34, an unillustrated coil-driving oscillator circuit and also an unillustrated power-loss detecting circuit. When the vehicle A passes the start end of the zone, if the transmission coils 33a, 33b currently form a closed loop, there is generated an induced current in this closed loop. Therefore, as compared with the case where the coils form an opened loop, there occurs more power loss in the coupling sensor 39. As the power-loss detecting circuit detects this increased power loss, the stored data at the reed switch 32 can be read out. When the vehicle A passes the terminal end of the zone, the power can be supplied through the coupling coil 53 to the power-receiving coil 34. That is, the coupling sensor 39 corresponds to the data transmission means.

On the other hand, the vehicle A mounts a vehicle-side communication unit 81b associated with the stationary communication unit 81a and the control device 9 for controlling travelling of this vehicle A based on the data obtained through the communication units 81a, 81b.

That is to say, the travelling control means 19 utilizes the control device 9.

The function of the control device 9 at the zone Z will be additionally described next. First, the control device 9 judges, at the upstream-side transmission coil 33a provided at the zone start end, whether the foregoing vehicle is present within the zone or not. With detection of vehicle-presence, the control device 9 allows the vehicle A to travel by a predetermined distance until the vehicle is stopped at a position where the vehicle A can detect the downstream-side transmission coil 33b and waits for release of this vehicle-presence condition. With the release, the control device 9 allows the vehicle A to proceed into the zone Z and at this time the reed switch 32 is turned 'ON' by the magnet 30 to store a further vehicle-presence condition.

This vehicle-presence condition is released when the vehicle A passes the terminal end of the zone.

Incidentally, at the straight track portions other than the predetermined zones Z, the vehicle A is stopped upon detection by the optical sensor 12 of approaching of this vehicle relative to the foregoing vehicle.

In the foregoing embodiment, the two transmission coils 33a, 33b are provided and the vehicle A is stopped at the position where the downstream-side transmission coil 33b becomes detectable. Instead, it is also conceivable to use only one coil so that the vehicle is stopped at a position where this coil becomes detectable.

In the foregoing embodiment, the vehicle A is guided by means of the magnetic tape L at the predetermined zones Z as well. Instead, it is also conceivable to arrange the system so that the vehicle effects a self-contained run at these zones Z.

The vehicle A used by the system of the present invention can be a monorail type.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A vehicle control system for a multi-branching track, the system comprising:
   a vehicle (A);
   a plurality of stations (ST) at each of which said vehicle (A) is stopped;
   a main travelling track (L) for guiding the vehicle (A), said track (L) including a plurality of predetermined branch points (K), across each of said branch points (K) said main travelling track being discontinuously separated by predetermined distances between an upstream line and a plurality of downstream lines, said vehicle including means for sensing said main travelling track whereby said vehicle is adapted to effect guided runs on said upstream line and said downstream lines;
   a storage means (T) disposed before each said branch point (K) and storing data for selectively guiding the vehicle to one of said downstream lines;
   a mark (M) provided before each said branch point (K) for accurate detection of a branching start position of the vehicle;
   wherein said vehicle includes read means for reading the data stored at said storage means and a mark sensor (6) for detecting said mark (M);
   wherein said data stored at said storage means (T) includes data of branching directions of said downstream lines and further data of addresses of stations included in the respective downstream lines, said data and said further data being correlated with each other; and
   wherein said vehicle effects a self-contained run through said predetermined distances to switch over from said upstream line to one of said downstream lines and then switches to a guided run.

2. A system according to claim 1, wherein said storage means stores said address data, concerning the station located at said branch track after a converging point of the plurality of branch tracks, in association with branching direction data of a branch track having a shortest distance to a target station.

3. A system according to claim 1, wherein said main travelling track is constructed as an embedded laid-out magnetic structure fixedly surrounded with epoxy resin material and having a rectangular cross section, front and back faces of said magnetic structure having polarities opposite to each other.

4. A system according to claim 3, wherein a mark is provided at each station for accurate detection of a branching start position or a stop position of the vehicle.

5. A system according to claim 1, wherein said mark comprises a magnetic element embedded in the vehicle travelling surface, said element having opposite polarities at front and back faces thereof.

6. A system according to claim 1, wherein said vehicle further includes;
   a driving-steering wheel drivable by a propelling motor and steerable by a steering motor,
   a driven wheel,
   a magnetic sensor for detecting said track and obtaining therefrom data vehicle steering control,
   a mark sensor for detecting said mark, and
   a communication unit for communicating with said stations.

7. A system according to claim 1, wherein a mark is provided as a reference point utilized by the vehicle in switching over to said self-contained run after reading the stored data from said storage means, said vehicle including a mark sensor for detecting said mark, said data stored at said storage means including at least data concerning a distance from said mark to a point where the vehicle is to be switched over to said self-contained run.

8. A system according to claim 1, further comprising:
a stop control device for causing said vehicle guided along said main track to effect gradual speed reduction to reach a predetermined reduced speed before the predetermined stop position and then to cause said vehicle to stop at said predetermined stop position.

9. A system according to claim 8, wherein a data-writable storage means and a mark indicating a reference point are provided with a predetermined distance therebetween in the mentioned order from an upstream side relative to a travelling direction of said vehicle before said predetermined stop position;
said storage means storing at least data concerning a distance from said mark to said stop position;
said vehicle including;
a read means for reading the stored data of said storage means,
a mark sensor for detecting said mark,
a travelling distance measuring means,
a speed reduction device for reducing a travelling speed of the vehicle to a predetermined reduced speed, and
a control device for calculating, based on said distance data, said travelling distance from said mark and said predetermined reduced speed, a point for the vehicle to initiate speed reduction so that the vehicle achieves said predetermined reduced speed immediately before said predetermined stop position, said control device actuating said speed reduction device at said speed-reduction initiating point.

10. A system according to claim 9, wherein said vehicle includes a speed detecting means for detecting a travelling speed of the vehicle, said control device calculating said speed-reduction initiating point, based also on travelling speed data obtained by said speed detecting means.

11. A system according to claim 1, wherein a control mechanism is provided for preventing a subsequent vehicle from entering a predetermined zone within the vehicle travelling passage when said foregoing vehicle stays within said zone.

12. A system according to claim 11, wherein said control mechanism including;
a detecting means for detecting passage of a vehicle and storing the detection data without power supply,
an electric-powered release means for releasing, with electric power supply, the stored data at said detecting means,
a transmission coil for transmitting said stored data of said detecting means.
said detecting means, said electric-powered release means and said transmission coil being provided at a starting end of said predetermined zone,
a power-receiving coil provided at a terminal end of said zone for receiving the electric power to be supplied to said releasing means,
said vehicle including;
a detected member to be detected by said detecting means, an electromagnetic coupling type data transmission means for supplying the power through an electromagnetic coupling with said power-receiving coil, and
a travelling control means for controlling travelling of said vehicle,
said travelling control means being so constructed as to stop said subsequent vehicle when said data transmission means detects the data indicating presence of said foregoing vehicle and to allow said subsequent vehicle to enter said predetermined zone when said data transmission means detects absence of said foregoing vehicle within said predetermined zone.

13. A system according to claim 1, wherein said travelling control data further includes data concerning a turning radius, a turning speed and a travelling speed after the vehicle has switched over to one of the branch tracks.

14. A vehicle control system as claimed in claim 1,
wherein said travelling control data includes at least concerning a distance from said mark to a point where the vehicle is to be switched over to said self-contained run; and
wherein said vehicle further includes a magnetic sensor (5) including a number of magnetic sensing elements provided in said vehicle for sensing magnetism from the main travelling track, thereby to guide said vehicle to a proper position with respect to the travelling track.

15. A vehicle control system for a multi-branching track, the system comprising:
a vehicle (A);
a plurality of stations (ST) at each of which said vehicle (A) is stopped;
a main travelling track (L) discontinuously separated at predetermined positions (K) by predetermined distances between an upstream line (L1) and a plurality of downstream lines (L2), (L3);
a first mark (M1) provided before each said branch point (K) for accurate detection of a branching start position of the vehicle;
a second mark (M2) provided at each said station (ST) for accurate detection of a stop position of the vehicle;
a first storage means (T1) disposed before each said branch point (K) and storing data for selectively guiding the vehicle to any of the branch tracks (L1) , (L2) , (L3) , travelling control data for allowing said vehicle (A) to effect a self-contained run at each said branch point (K), and address data concerning addresses of stations included in the respective branch tracks;
a second storage means (T2) disposed before each said station (ST) and storing data at least concerning a distance from said first mark (M1) to said stop position;
said vehicle further including a magnetic sensor (5) for sensing said main travelling track (L);
a mark sensor (6) for sensing said first and second marks (M1), (M2);
a read means (7) for reading the data stored respectively at said first storage means (T1) and said second storage means (T2);
a control unit (9) for causing the vehicle (A) to effect said self-contained run or to make a stop at one of said stations (ST) based on information obtained from said read means (7) and said mark sensor (6), wherein said first storage means (T1) stores address data concerning addresses of stations included in the travelling track after the plurality of branch tracks join together, thereby to determine a proper branch track through which the vehicle reaches each said station (ST) by the shortest distance;

wherein said vehicle (A) detects said first mark (M1) by said mark sensor (6) and travels by a predetermined distance from said first mark (M1) and then effects said self-contained run over the section discontinuously separated by predetermined distances in accordance with said travelling control data stored at said first storage means (T1), thereby to switch over from said upstream line (L1) to one of said downstream lines (L2), (L3);

wherein said travelling control data includes data at least concerning a distance from said first mark (M1) to a point where the vehicle is to be switched over to said self-contained run; and wherein said magnetic sensor (5) includes a number of magnetic sensing elements provided in said vehicle (A) to sense magnetism from said main travelling track (L), thereby to guide said vehicle (A) to a proper position with respect to said main travelling track (L).

16. A vehicle control system for a multi-branching track, the system comprising:

a main travelling track (L) for guiding a vehicle (A), said main travelling track including, at predetermined positions (K), (J), (C), upstream lines and downstream lines with the upstream lines being discontinuously separated by predetermined distances from the downstream lines, such that said vehicle effects a self-contained run through the predetermined distances according to predetermined travelling control data to switch over from one of said upstream lines to one of said downstream lines;

a storage means (T) disposed before a branch point and storing data for selectively guiding the vehicle to one or a plurality of branch tracks;

a read means (7) mounted on the vehicle (A) and for reading the data stored at said storage means, wherein said storage means (T) stores data of branching directions of the branch tracks and further data of addresses of stations included in the respective branch tracks, said data and further data being correlated with each other;

a further storage means provided before each said predetermined positions (K), (J), (C), said further storage means storing data for said self-contained vehicle run;

a mark (M) provided as a reference point utilized by the vehicle in switching over to said self-contained run after reading the stored data at said storage means, said vehicle including a mark sensor (6) for detecting said mark (M), said travelling control data stored at said storage means (T) including data at least concerning a distance from said mark (M) to a point where the vehicle is to be switched over to said self-contained run; and a magnetic sensor (5) including a number of magnetic sensing elements provided in the vehicle (A) to sense magnetism from said main travelling track (L), thereby to guide said vehicle (A) to a proper position with respect to said travelling track (L).

17. A vehicle control system for a multi-branching track, the system comprising:

a vehicle (A);

a plurality of stations (ST) at each of which said vehicle (A) is stopped;

a main travelling track (L) for guiding the vehicle (A), said track (L) including a plurality of predetermined branch points (K), across each of said branch points (K) said main travelling track being discontinuously separated by predetermined distances between an upstream line (L1) and a plurality of downstream lines (L2), (L3);

a storage means (T) disposed before each said branch point (K) and storing data for selectively guiding the vehicle to one of a plurality of branch tracks (L1), (L2), (L3);

a mark (M) provided before each said branch point (K) for accurate detection of a branching start position of the vehicle;

wherein said vehicle includes read means for reading the data stored at said storage means and a mark sensor (6) for detecting said mark (M);

wherein said data stored at said storage means (T) includes data of branching directions of said branch tracks (L1), (L2), (L3) and further data of addresses of stations included in the respective branch tracks (L1), (L2), (L3), said data and said further data being correlated with each other;

wherein said vehicle effects a self-contained run through said predetermined distances to switch over from said upstream line (L1) to one of said downstream lines (L2), (L3);

wherein said travelling control data includes at least concerning a distance from said mark to a point where the vehicle is to be switched over to said self-contained run; and wherein said vehicle further includes a magnetic sensor (5) including a number of magnetic sensing elements provided in the vehicle for sensing magnetism from the main travelling track, thereby to guide said vehicle to a proper position with respect to the travelling track.

* * * * *